United States Patent
Li et al.

(10) Patent No.: US 12,337,561 B1
(45) Date of Patent: Jun. 24, 2025

(54) WAFER-LEVEL LENS ASSEMBLY INCLUDING VOIDS

(71) Applicant: Meta Platforms Technologies, LLC, Menlo Park, CA (US)

(72) Inventors: Likai Li, Cupertino, CA (US); Eddie Alex Azuma, Pleasanton, CA (US); Aysegul Altunbas, San Jose, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 918 days.

(21) Appl. No.: 17/323,556

(22) Filed: May 18, 2021

(51) Int. Cl.
| | |
|---|---|
| *G02B 7/02* | (2021.01) |
| *B29D 11/00* | (2006.01) |
| *G02B 27/00* | (2006.01) |
| *G06F 3/01* | (2006.01) |
| *G02B 3/00* | (2006.01) |
| *G02B 3/02* | (2006.01) |

(52) U.S. Cl.
CPC .. *B29D 11/00278* (2013.01); *B29D 11/00317* (2013.01); *B29D 11/00365* (2013.01); *G06F 3/013* (2013.01); *G02B 2003/0093* (2013.01); *G02B 3/02* (2013.01); *G02B 7/028* (2013.01); *G02B 27/0093* (2013.01)

(58) Field of Classification Search
None
See application file for complete search history.

(56) References Cited

U.S. PATENT DOCUMENTS

| | | | |
|---|---|---|---|
| 2005/0128595 A1* | 6/2005 | Shimizu | G02B 3/0056 349/98 |
| 2012/0242814 A1* | 9/2012 | Kubala | B29D 11/00307 83/13 |
| 2014/0118664 A1* | 5/2014 | Nimura | G02B 3/0056 349/95 |
| 2015/0077856 A1* | 3/2015 | Neo | G02B 3/0037 359/619 |
| 2022/0352441 A1* | 11/2022 | Lutgen | H01L 33/62 |

* cited by examiner

*Primary Examiner* — Robert E. Tallman
(74) *Attorney, Agent, or Firm* — Freestone Intellectual Property Law PLLC; Aaron J. Visbeek

(57) ABSTRACT

An apparatus, system, and method for a lens assembly having corner voids. The lens assembly may include a rectangle glass layer including four corners and a plastic layer including an optical element. In some examples, the plastic layer includes four corner voids aligned over the four corners of the rectangle glass layer.

19 Claims, 6 Drawing Sheets

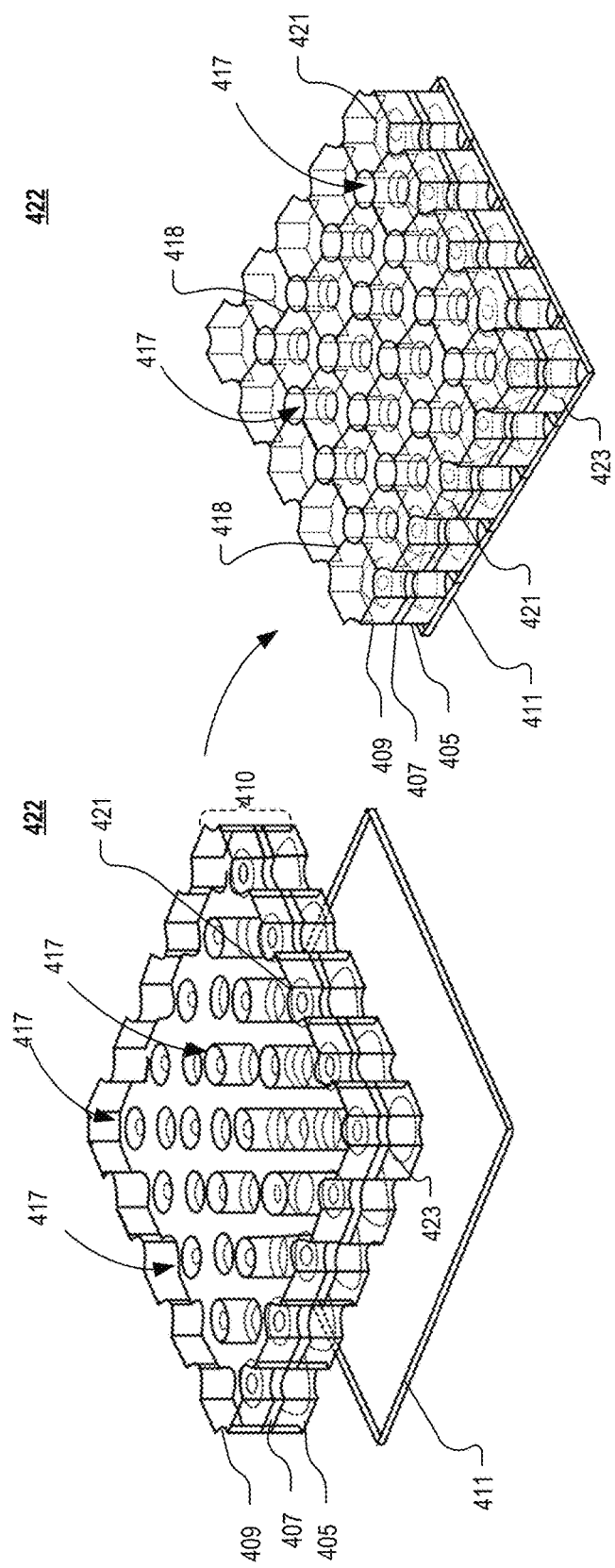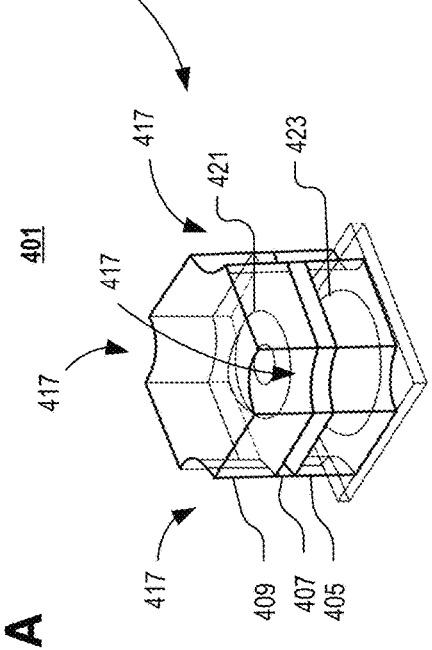
FIG. 4A
FIG. 4B
FIG. 4C

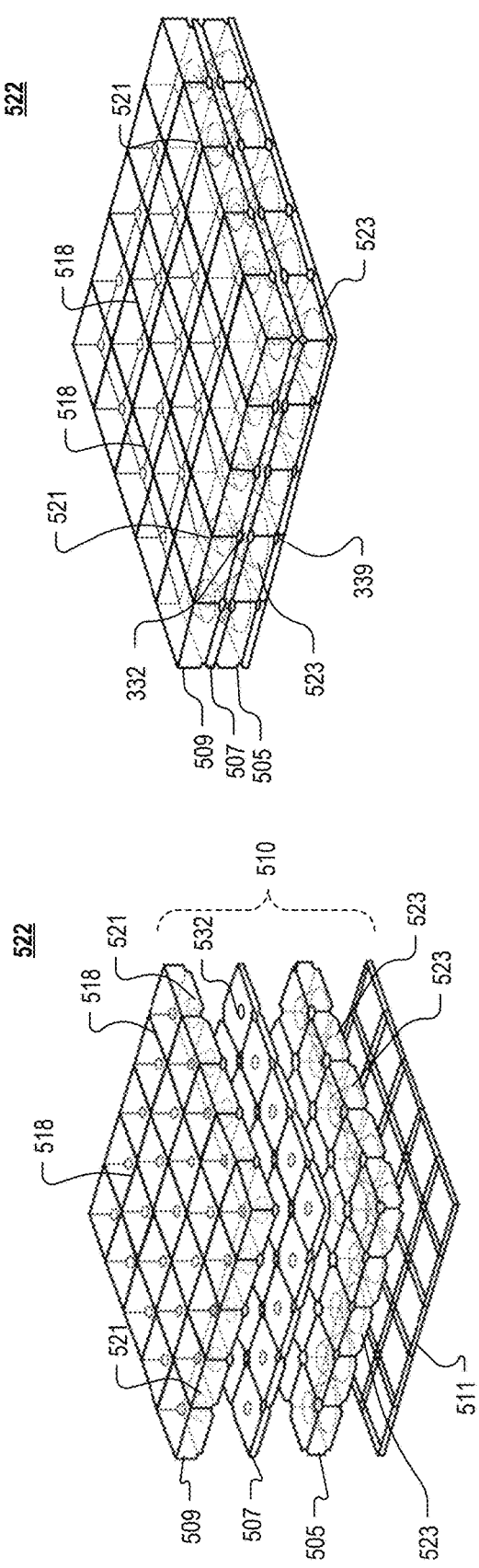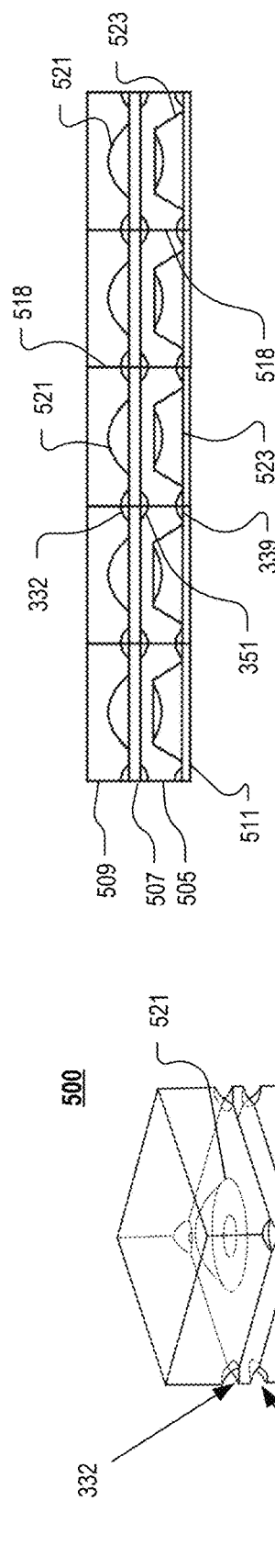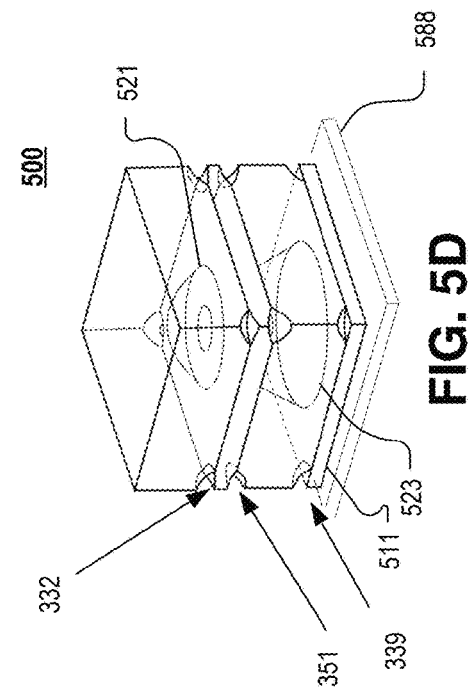
FIG. 5A
FIG. 5B
FIG. 5C
FIG. 5D

WAFER-LEVEL LENS ASSEMBLY INCLUDING VOIDS

TECHNICAL FIELD

This disclosure relates generally to wafer-level optics processes, and in particular, but not exclusively, to fabrication of lens assemblies.

BACKGROUND INFORMATION

Cameras have become ubiquitous in consumer electronics. For example, smart phones, tablets, action-cameras, laptops, and even monitors may incorporate a camera. Typically, the cameras that are incorporated into consumer electronics include a lens assembly that is common in smart phones in order to take advantage of the pricing available due to the volume production of these lens assemblies.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 4A-4C illustrate an example process associated with fabricating the lens assembly of FIG. 2, in accordance with aspects of the disclosure.

FIGS. 5A-5D illustrate an example process associated with fabricating the lens assembly of FIGS. 3A and 3B, in accordance with aspects of the disclosure.

DETAILED DESCRIPTION

Figure 1:
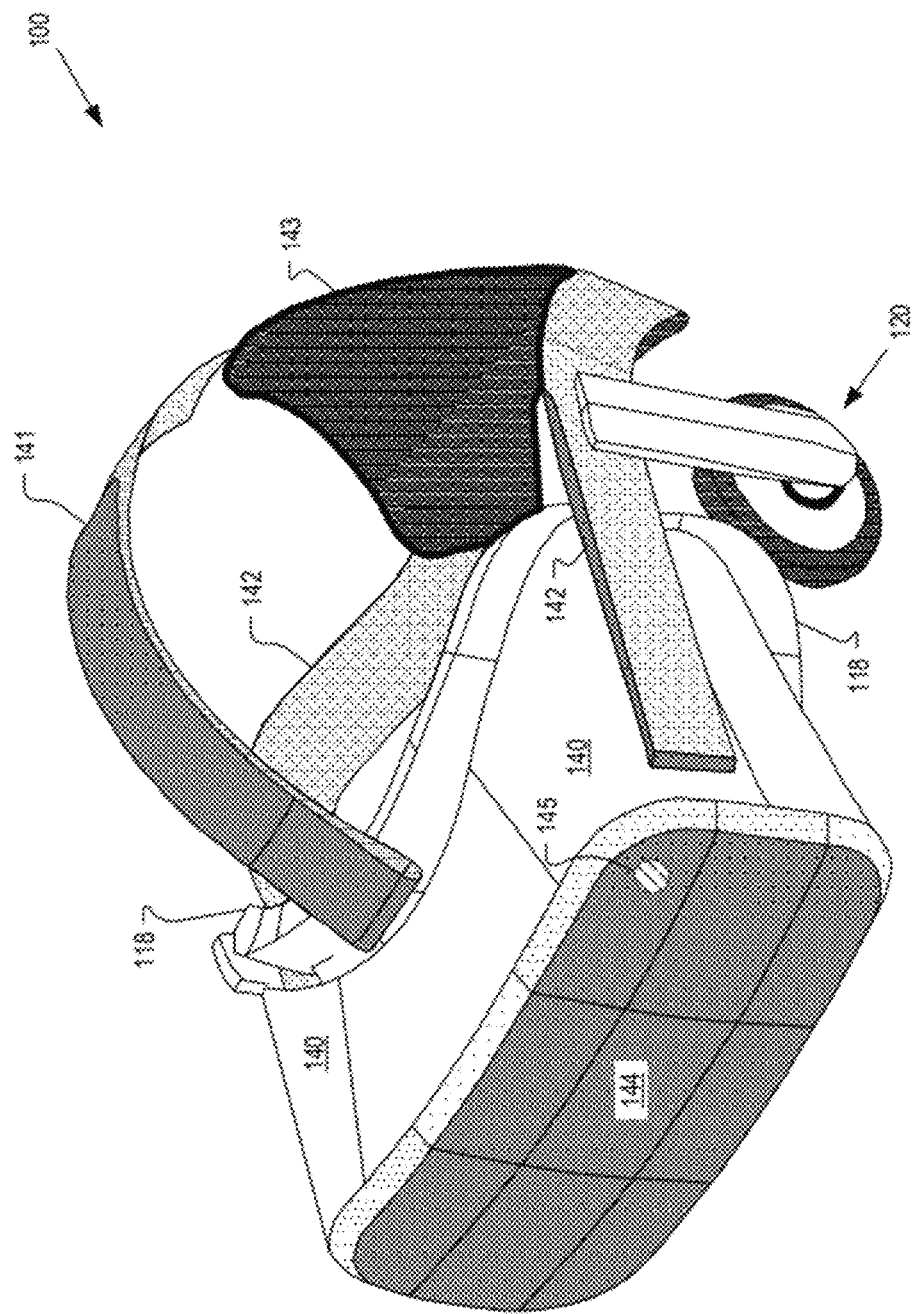
FIG. 1 illustrates a head mounted display (HMD), in accordance with aspects of the disclosure.

Embodiments of wafer level assemblies that include voids are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The description may use perspective-based descriptions such as top/bottom, in/out, over/under, and the like. Such descriptions are merely used to facilitate the discussion and are not intended to restrict the application of embodiments described herein to any particular orientation.

As noted above, wafer level optics (WLO) fabrication of lens assemblies may include the formation of optical plastic or glass wafers into an optical wafer stack, which is then diced or singulated to produce separate units. Challenges may arise, however, when the wafer stack is composed of both optical plastic (hereinafter "plastic") and glass. For example, glass and plastic have significantly different coefficients of thermal expansion. Thus, when the lens assembly includes adjacent layers of plastic and glass, expansion or contraction of the layers can cause stress at the bonding interface. In a rectangular unit or lens assembly, the stress is typically concentrated in the corners and can result in, e.g., delamination or cracking of the lens assembly when exposed to temperature extremes.

Accordingly, an apparatus, system, and method for a wafer-lens assembly including voids for reducing corner stress are described in this disclosure. In embodiments, the wafer-lens assembly includes one or more plastic layers having corner voids aligned over four corners of a rectangle glass layer to reduce stress caused by a difference in a coefficient of thermal expansion between the rectangle glass layer and the plastic layer. In some aspects, the corner voids may assist in preventing delamination and other issues with bonding between the layers.

As will be described below, in some examples, the voids can be pre-drilled or pre-molded in plastic layers of an optical wafer stack. Thus, in some examples the voids can be formed in the plastic layers before, during, or after a formation of an optical element (e.g., lens or lens element) in a plastic layer. For example, in some embodiments, pre-molded voids can be molded or formed at a same or similar time that lens elements are molded from a master wafer. In other examples, voids can be pre-drilled into separate plastic layers after the plastic layer has been molded to include optical elements and prior to or after bonding of the optical wafer stack.

Accordingly, embodiments of the methods, apparatuses, and systems described below are compatible with and may be integrated into existing WLO processes for producing lens assemblies. These and other embodiments are described in more detail in connection with FIGS. 1-6.

FIG. 1 illustrates a head-mounted device (HMD) 100, in accordance with aspects of the present disclosure. As described further below, in embodiments, HMD 100 may include a camera module (e.g., an eye-tracking camera) that may include a lens assembly having corner voids as described in connection with below FIGS. 2-6. An HMD, such as HMD 100, is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100.

In some examples, an electronic component 145 may be included in viewing structure 140. In some aspects, the electronic component 145 includes a camera including a lens assembly for focusing light to the image sensor of the camera. Implementations of the disclosure may also be used in eye-tracking camera includes a lens assembly having corner voids as described in connection with FIGS. 2-6 below.

In some aspects, the electronic component 145 may be mated with an optical assembly that includes one or more small-diameter optical elements, such as a lens, e.g., of the lens assembly noted above, a polarizer, a waveguide, reflector, a waveplate, etc. In some aspects, a "small-diameter" optical element refers to an optical element having a diameter (e.g., aperture) that is 3 millimeters or less. As mentioned above, as the requirements for the miniaturization of the various systems (e.g., eye-tracking system or SLAM system) of an HMD increases, so too does the need to reduce the size of the optical systems that may be incorporated with the electronic component 145.

Figure 2:
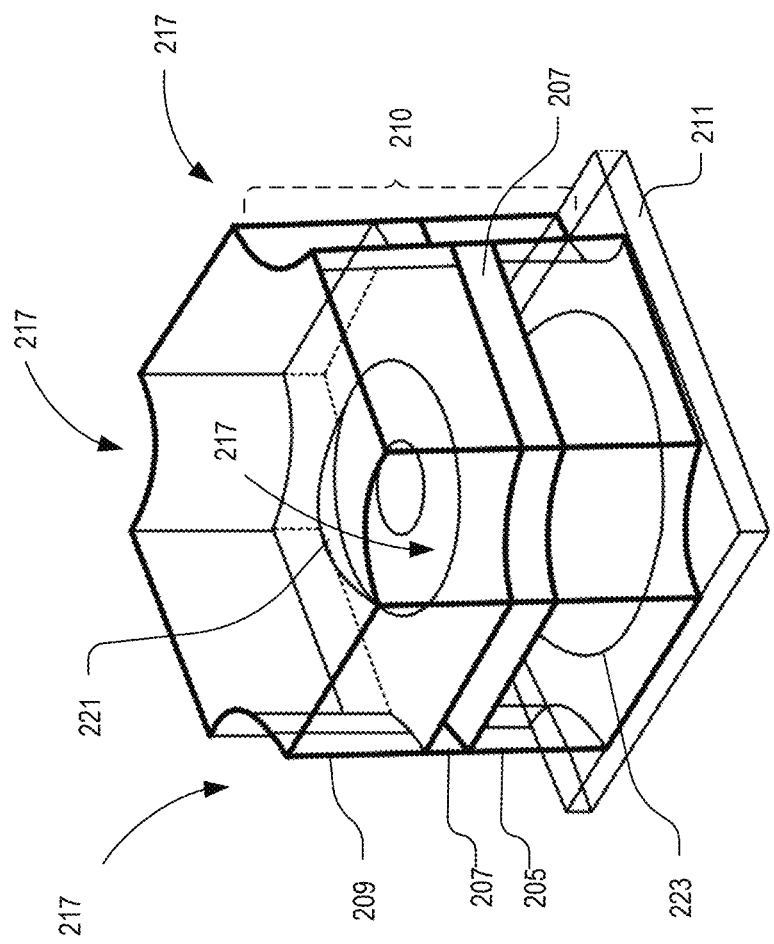
FIGS. 2 and 3A-3B illustrate lens assemblies that each include corner voids, in accordance with various aspects of the disclosure.
Figures 3A, 3B:
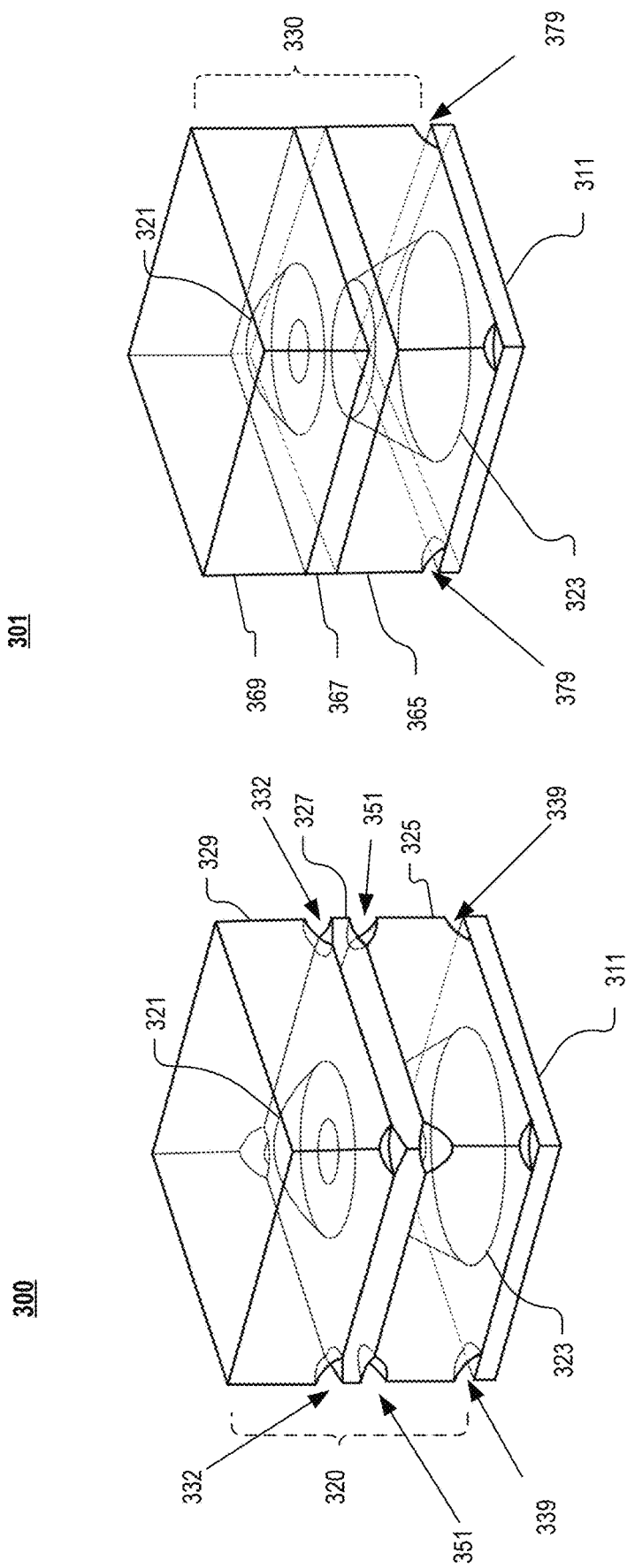

FIGS. 2 and 3A-3B illustrate lens assemblies that each include corner voids, in accordance with aspects of the disclosure. Briefly, FIG. 2 illustrates an example lens assembly including corner voids that penetrate a full thickness of a plastic layer in which it is formed. In contrast, FIG. 3A illustrates an example lens assembly having a corner voids where a depth of the each of the corner voids is less than a thickness of a corresponding plastic layer. FIG. 3B illustrates an example lens assembly 231 formed in a similar manner to the lens assembly of FIG. 3A, however, the corner voids are located only in a plastic layer which immediately overlays a rectangle glass layer.

FIG. 2 illustrates a lens assembly 201 having a plurality of plastic layers 210 including four corner voids 217 that penetrate a full thickness of a plastic layer and have partially cylindrical surfaces, according to embodiments. In one example, plurality of plastic layers 210 includes a first plastic layer 205, second plastic layer 207, and third plastic layer 209. As shown, plurality of plastic layers 210 resides over a rectangle glass layer 211. As noted above, in the embodiment of FIG. 2, four corner voids 217 are voids that penetrate through a full thickness of each of the plurality of plastic layers 210. In some aspects, four corner voids 217 are aligned over the four corners of the rectangle glass layer to reduce corner stress caused by a difference in a coefficient of thermal expansion between rectangle glass layer 211 and the plurality of plastic layers 210, and in particular first plastic layer 205.

In one example, each of first plastic layer 205, second plastic layer 207, and third plastic layer 209 include at least one optical element. In the embodiments shown, an optical element may include e.g., a lens or lens element, an optical coating, or other optical structure formed in a glass layer for correction of, e.g., an optical aberration. In some aspects, the lens may include a shape formed along a surface of a respective plastic layer and a lens element may include any suitable structure or shape that may assist in providing or enhancing the function of the lens. As shown in the embodiment of FIG. 2, first plastic layer 205 includes an optical element 223 while third plastic layer 209 includes an optical element 221. Optical elements 223 and/or 221 may be refractive optical elements, in some implementations. Note that in embodiments, second plastic layer 207 may include at least one optical element but which is obscured by the other plastic layers in FIG. 2.

FIG. 3A is a perspective view of a lens assembly 300 having a plurality of corner voids where a depth of the each of the corner voids is less than a thickness of a plastic layer in which it is formed. In the embodiment, plurality of plastic layers 320 includes a first plastic layer 325, a second plastic layer 327, and a third plastic layer 329. As shown in FIG. 3A, first plastic layer 325 overlays a rectangle glass layer 311. Note that in the embodiment, first plastic layer 325 includes four lower corner voids including corner voids 339 formed in a bottom surface of first plastic layer 325. First plastic layer 325 also includes four upper corner voids 351.

In the embodiment shown, third plastic layer 329 includes four lower corner voids 332. Note that although there are at least four corner voids in each layer, only two of corner voids 332, 339, and 351 are labeled in order to maintain clarity in the FIG. In the embodiment, each of first plastic layer 325, second plastic layer 327, and third plastic layer 329 include at least one optical element (e.g., optical element 321 and optical element 323) in third plastic layer 329, similar to the optical elements as described above with respect to FIG. 2.

In embodiments, the corner voids in each of plurality of plastic layers 320 reduce corner stress caused by a difference in a coefficient of thermal expansion between rectangle glass layer 311 and plurality of plastic layers 320.

FIG. 3B is a perspective view of a lens assembly 301 where corner voids are located in a first plastic layer 365 which immediately overlays rectangle glass layer 311. In FIG. 3B, plurality of plastic layers 330 includes first plastic layer 365, a second plastic layer 367, and a third plastic layer 369. Similar to the plastic layers of FIGS. 2 and 3A, plastic layers 365, 367 and 369 each include one or more optical elements (e.g., lens or lens elements, coating, or structures to address optical aberrations). For example, third plastic layer 369 and first plastic layer 365 include respective optical elements 321 and 323. In the embodiment of FIG. 3B, plastic layer 365 includes four lower corner voids 379 (note that only two corner voids are labeled for clarity in the FIGS). In embodiments, second plastic layer 367, and a third plastic layer 369 do not include corner voids. In the example, only bottom plastic layer 365 includes corner voids and is the only plastic layer in direct contact with rectangle glass layer 311.

FIGS. 4A-4C illustrate an example process associated with fabricating a lens assembly similar or the same as the lens assembly in FIG. 2, in accordance with aspects of the disclosure. FIGS. 4A and 4B illustrate a portion of an optical wafer stack 422 ("optical wafer 422") including pre-drilled voids, according to aspects of the disclosure.

In FIG. 4A, optical wafer 422 is shown prior to attachment or bonding to a portion of a glass wafer or glass layer 411. FIG. 4B illustrates optical wafer 422 after being bonded to glass wafer 411 and further includes grid lines 418 along which optical wafer 422 will be singulated to create corner voids of the lens assembly of FIG. 4C. In embodiments, plurality of plastic wafers 410 includes a first plastic layer 405, a second plastic layer 407, and a third plastic layer 409. Each of plastic layers 405, 407, and 409 include a corresponding plurality of optical elements 421 or 423 (note that only a few optical elements have been labeled for clarity in the FIGS) arranged in an array across plastic layers 405, 407, and 409. In embodiments, the optical elements include lens elements and the like, similar to as discussed in connection with FIGS. 2 and 3A-3B.

In the embodiment of FIGS. 4A and 4B, optical wafer 422 includes a plurality of voids 417 which will ultimately form corner voids after singulation (only a few voids 417 are labeled for clarity in the FIGS). Plurality of voids 417 include pre-drilled voids that penetrate a full thickness of each of the plurality of plastic wafers 410. In some aspects, the pre-drilled voids are drilled through a plastic wafer prior to a molding of optical elements onto the plastic wafer. In various embodiments, the pre-drilled voids can be created with processes compatible with WLO processes, such as precision mechanical drilling or micro-laser drilling.

As shown in FIG. 4B, singulation lines, e.g., 418, intersect with each of the plurality of voids 417. In embodiments, singulation of optical wafer 422, results in a plurality of lens assemblies, such as lens assembly 401 of FIG. 4C. As shown, lens assembly 401 includes corner voids 417 which penetrate a top surface of the plastic layer and a bottom surface of each of plastic layers 405, 407, and 409. In embodiments, four corner voids 417 have partially cylindrical surfaces.

FIGS. 5A-5D illustrate an example process associated with fabricating the lens assembly of FIG. 3A, in accordance with aspects of the disclosure. FIGS. 5A-5C are perspective and side views of a portion of an optical wafer stack including plastic layers with voids that are pre-molded, in accordance with aspects of the disclosure. In embodiments, prior to stacking of an optical wafer, the voids are pre-molded onto each plastic lens wafer ("plastic wafer") that forms a plastic layer. FIG. 5D illustrates resulting lens assembly 500 after singulation. Note that lens assembly 500 is also shown in FIG. 3A and for simplicity, certain elements in FIG. 5D will not be reintroduced.

As illustrated in FIGS. 5A-5C, a depth of the voids are less than a thickness of the plastic layer in which it is formed. FIG. 5A illustrates a portion of an optical wafer 522 prior to bonding and singulation. A glass wafer 511 and a plurality of plastic wafers 510 including a first plastic layer 505, a second plastic layer 507, and a third plastic layer 509 are to form optical wafer 522. Each of plastic layers 505, 507, and 509 include a plurality of optical elements (e.g., 521, 532, 523) arranged in an array across the plastic layers of its corresponding plastic wafer. Note that only one of a few optical elements are labeled for clarity.

In some embodiments, each of the first, second, and third plastic layers 505, 507, and 509 are molded separately to include a plurality of pre-molded voids or cavities. In embodiments, a cast plastic optics process where a curable liquid material is introduced into or onto a mold and allowed to solidify may be used. In some examples, the curable liquid material is an optically clear resin or polymer. In some embodiments, a master wafer has been created as a mold to create optical elements (e.g., a lens and/or other lens elements) as well as a desired size, shape, and orientation of a plurality of voids. Although a cast plastics optics process is described above, any suitable molded optics process compatible with WLO fabrication may be used to produce one or more of plastic layers 505, 507, and 509. After formation of individual plastic lens wafers including each of plastic layers 505, 507, and 509, the individual plastic lens wafers are bonded together with an adhesive bonding agent to form optical wafer stack 522. The adhesive bonding agent may be optically clear adhesive (OCA).

In the embodiment, a plurality of voids or pre-molded voids (seen more clearly in the side view of FIG. 5C discussed below) are arranged among a plurality of optical elements to reduce stress caused by a difference in a coefficient of thermal expansion between the plastic layers (e.g., first or bottom plastic layer 505, in particular) and glass layer 511 after optical wafer 522 is singulated.

FIG. 5C is a side view of optical wafer 522. In FIG. 5C, a plurality of voids e.g., voids 332, 339 and 351 which will ultimately form corner voids are shown in FIG. 5D. In embodiments, dicing or singulation may occur along a plurality of grid lines 518 which intersect with each of the plurality of voids of optical wafer 522 to form resulting corner voids of individual lens assemblies. For example, FIG. 5D illustrates resulting lens assembly 500 after singulation. As noted above, dicing along grid lines 518 intersects with voids in plurality of plastic layers 510, resulting in corner voids e.g., 332, 351, and 339.

In some embodiments, lens assembly 500 is further coupled to an image sensor (e.g., see 588) along a bottom or second surface of glass layer 511. In some embodiments, the image sensor is originally formed on a silicon wafer that is bonded to optical wafer 522 which is then singulated. In other embodiments, lens assembly 221 has already been separated from optical wafer 522 and is attached separately to the image sensor. Note that in some examples, a similar image sensor may be attached to the lens assemblies of FIGS. 2 and 3A as well.

Note that in embodiments, an image sensor may include a complementary metal-oxide semiconductor (CMOS) image sensor. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs that emit the narrow-band wavelength may be oriented to illuminate an eye with the narrow-band infrared wavelength. In embodiments, rectangle glass layers or glass layers 211-511 of FIGS. 2-5D may include a cover for the image sensor and/or provide an infrared filter as described above. Thus in some embodiments, the rectangle glass layers include a filter to reduce or eliminate a wavelength of light received by the image sensor.

It is understood that the lens assemblies having three plastic layers and a single glass layer of FIGS. 2-5D are merely examples. Embodiments may include any suitable number and combination of plastic and glass layers to assist in achieving a desired lens performance. Furthermore in some configurations, a glass layer may be located in one or more different locations of the wafer stack, rather than only on a bottom layer as shown in the above FIGS. In various embodiments, the lens assemblies having corner voids may be used with optical wafers that are further stacked onto substrates made of materials other than glass where it may be beneficial to relieve stress due to coefficient of thermal expansion differences.

Figure 6:
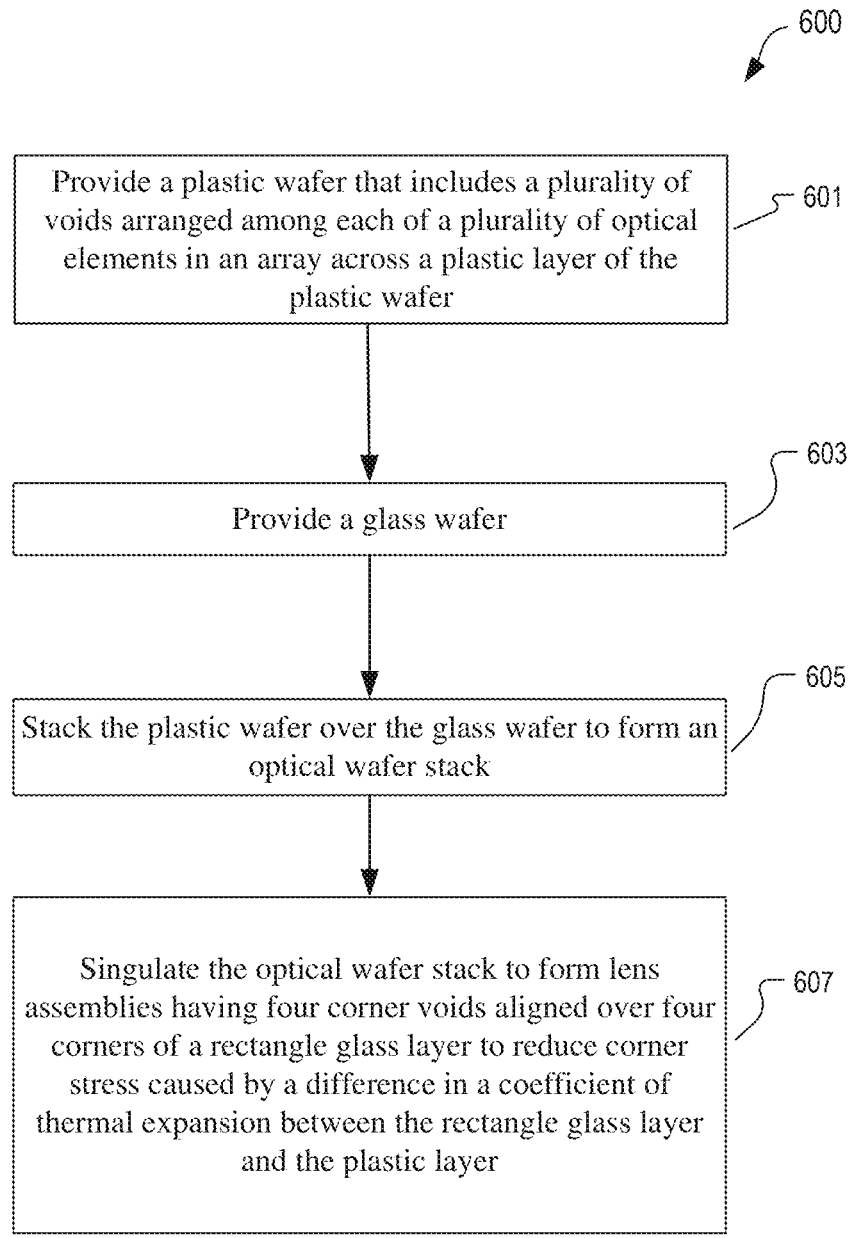
FIG. 6 is a flow chart illustrating an example process associated with fabricating lens assemblies, in accordance with aspects of the disclosure.

FIG. 6 is a flow chart illustrating an example process 600 of fabricating a lens assembly having four corner voids. In process block 601, a plastic wafer including a plurality of optical elements is provided. In some aspects, a plurality of voids are arranged among each of the plurality of optical elements in an array across a first plastic layer of the plastic wafer. At a next process block 603, a glass wafer or substrate is provided. In embodiments, the glass wafer or other substrate has a coefficient of thermal expansion that is significantly different from the plastic wafer.

At a next process block 605, in one example, the plastic wafer is stacked and bonded over the glass wafer or other substrate to form an optical wafer stack. Finally, at a process block 607, in the example, the optical wafer stack is diced to form lens assemblies having four corner voids. In embodiments, the four corner voids are aligned over four corners of a rectangle glass layer or substrate layer to reduce corner stress caused by a difference in a coefficient of thermal expansion between the rectangle glass layer and the plastic layer.

In embodiments, the lens assembly further includes a second plastic layer (e.g., 207 of FIG. 2) including a second optical element. In some aspects, the second plastic layer includes second corner voids aligned over the four corner voids and is aligned over the four corners of the rectangle glass layer. In addition, the lens assembly may further include a third plastic layer (e.g., 209 of FIGS. 2 and 329 FIG. 3A) including a third optical element. In embodiments, the third plastic layer includes third corner voids aligned over the second corner voids, aligned over the four corner voids, and aligned over the four corners of the rectangle glass layer.

It is understood that the order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
   a rectangle glass layer including four corners; and
   a plastic layer including an optical element, wherein the plastic layer includes four corner voids aligned over the four corners of the rectangle glass layer to reduce corner stress caused by a difference in a coefficient of thermal expansion between the rectangle glass layer and the plastic layer, wherein the optical element includes at least one of a lens, a lens element, an optical coating, or one or more structures for correction of an optical aberration.

2. The lens assembly of claim 1, wherein the four corner voids penetrate a full thickness of the plastic layer, and wherein the four corner voids have partially cylindrical surfaces.

3. The lens assembly of claim 1, wherein a depth of the four corner voids is less than a thickness of the plastic layer.

4. The lens assembly of claim 1, wherein the four corner voids penetrate a top surface of the plastic layer and a bottom surface of the plastic layer.

5. The lens assembly of claim 1 further comprising:
a second plastic layer including a second optical element, wherein the second plastic layer includes second corner voids aligned over the four corner voids and aligned over the four corners of the rectangle glass layer.

6. The lens assembly of claim 5 further comprising:
a third plastic layer including a third optical element, wherein the third plastic layer includes third corner voids aligned over the second corner voids, aligned over the four corner voids, and aligned over the four corners of the rectangle glass layer.

7. The lens assembly of claim 1, wherein the rectangle glass layer is attached to the plastic layer along a first surface and a second surface for disposing over an image sensor.

8. The lens assembly of claim 7, wherein the rectangle glass layer comprises a filter to reduce or eliminate a wavelength of light received by the image sensor.

9. An optical wafer comprising:
a glass layer;
a first plastic layer disposed over the glass layer, wherein the first plastic layer includes a plurality of optical elements arranged in an array across the first plastic layer, wherein the array includes a plurality of voids arranged among the plurality of optical elements to reduce stress caused by a difference in a coefficient of thermal expansion between the first plastic layer and the glass layer after the optical wafer is singulated into a plurality of lens assemblies; and
a second plastic layer disposed over the first plastic layer and including a second plurality of optical elements, wherein a second plurality of voids on the second plastic layer are aligned with the first plurality of voids to provide four corner voids proximal to each optical element after singulation.

10. The optical wafer of claim 9, wherein the plurality of voids are arranged to form four corner voids in each of the plurality of lens assemblies after the optical wafer is singulated.

11. The optical wafer of claim 9, wherein the plurality of voids penetrate a full thickness of the first plastic layer, and wherein each of the plurality of voids are cylindrical.

12. The optical wafer of claim 9, wherein a depth of each of the plurality of voids is less than a thickness of the first plastic layer.

13. The optical wafer of claim 9, wherein the voids of the plurality of voids penetrate a top surface of the first plastic layer and a bottom surface of the first plastic layer.

14. A head-mounted device (HMD) comprising:
a head-mounted display system;
an eye tracking camera to capture an image of an eye of a user viewing images provided by the head-mounted display system; and
a lens assembly included in the eye tracking camera, wherein the lens assembly includes:
a rectangle glass layer including four corners; and
a plastic layer including an optical element, wherein the plastic layer includes four corner voids aligned over the four corners of the rectangle glass layer.

15. The HMD of claim 14, wherein the four corner voids in the lens assembly penetrate a full thickness of the plastic layer, and wherein the four corner voids have partially cylindrical surfaces.

16. The HMD of claim 14, wherein a depth of the four corner voids is less than a thickness of the plastic layer.

17. The lens assembly of claim 1, wherein the plastic layer does not contact the four corners of the rectangle glass layer due to the four corner voids of the plastic layer being aligned over the four corners of the rectangle glass layer.

18. The lens assembly of claim 1, wherein the four corner voids of the plastic layer reduce direct contact between the plastic layer and the four corners of the rectangle glass layer.

19. The HMD of claim 14, wherein the plastic layer does not contact the four corners of the rectangle glass layer due to the four corner voids of the plastic layer being aligned over the four corners of the rectangle glass layer.

* * * * *